Patented Oct. 14, 1952

2,614,218

UNITED STATES PATENT OFFICE 2,614,218

TIMING DEVICE

Noel W. Hancock, Cedar Rapids, Iowa, assignor to Collins Radio Company, Cedar Rapids, Iowa, a corporation of Iowa Application November 23, 1949, Serial No. 128,980

8 Claims. (Cl. 250—27)

This invention relates in general to timing devices and in particular to a master timer.

Radar requires a plurality of signals very accurately spaced in time whenever the scanning cycle occurs. For example, when it is desired to transmit, a first signal might be used to get the transmitter prepared to transmit, a second signal accurately spaced in time with respect to the first signal might be used to prepare the ranging circuitry, and a third signal might start the transmission of the pulse. Since a radar set may scan many thousand times a second and three or more signals may be required each time prior to scanning, it is seen that obtaining the signals always accurately spaced might be difficult.

The rate of scanning may vary so that jamming will be more difficult. It is well known that if the pulse repetition rate is discovered by an enemy, he may render radar ineffective by transmitting a signal which jams the pulse repetition frequency. It is desirable, therefore, to provide a radar set which scans in a random manner, so that it is impossible to jam it by transmitting pulses on only one frequency.

It is an object of this invention, therefore, to provide a master timer which may be actuated in a random manner.

A further object of this invention is to provide a master timer which always gives a predetermined number of pulses accurately spaced in time when it is triggered by a control signal.

Figure 1:
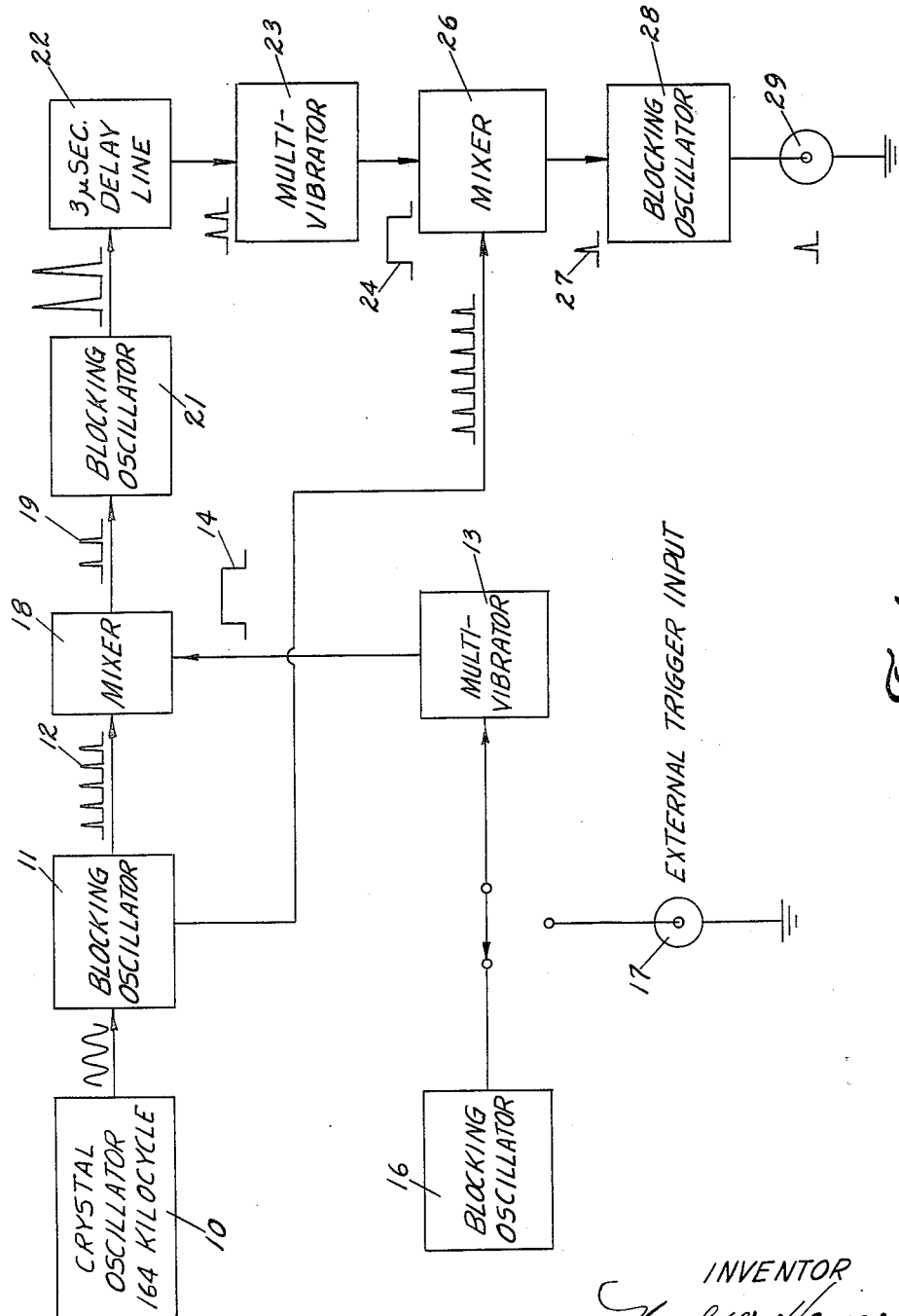
Figure 2:
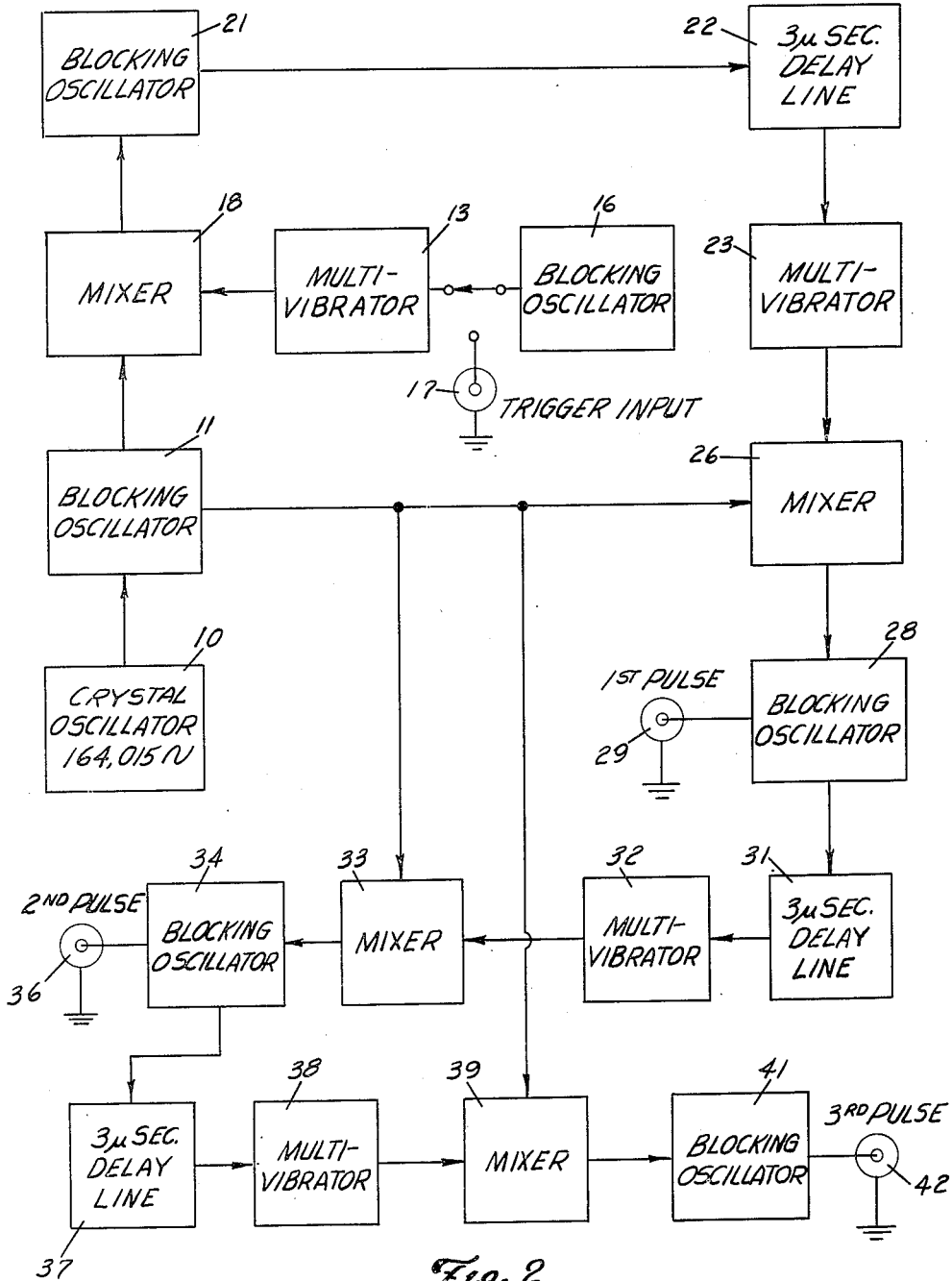
Figure 3:
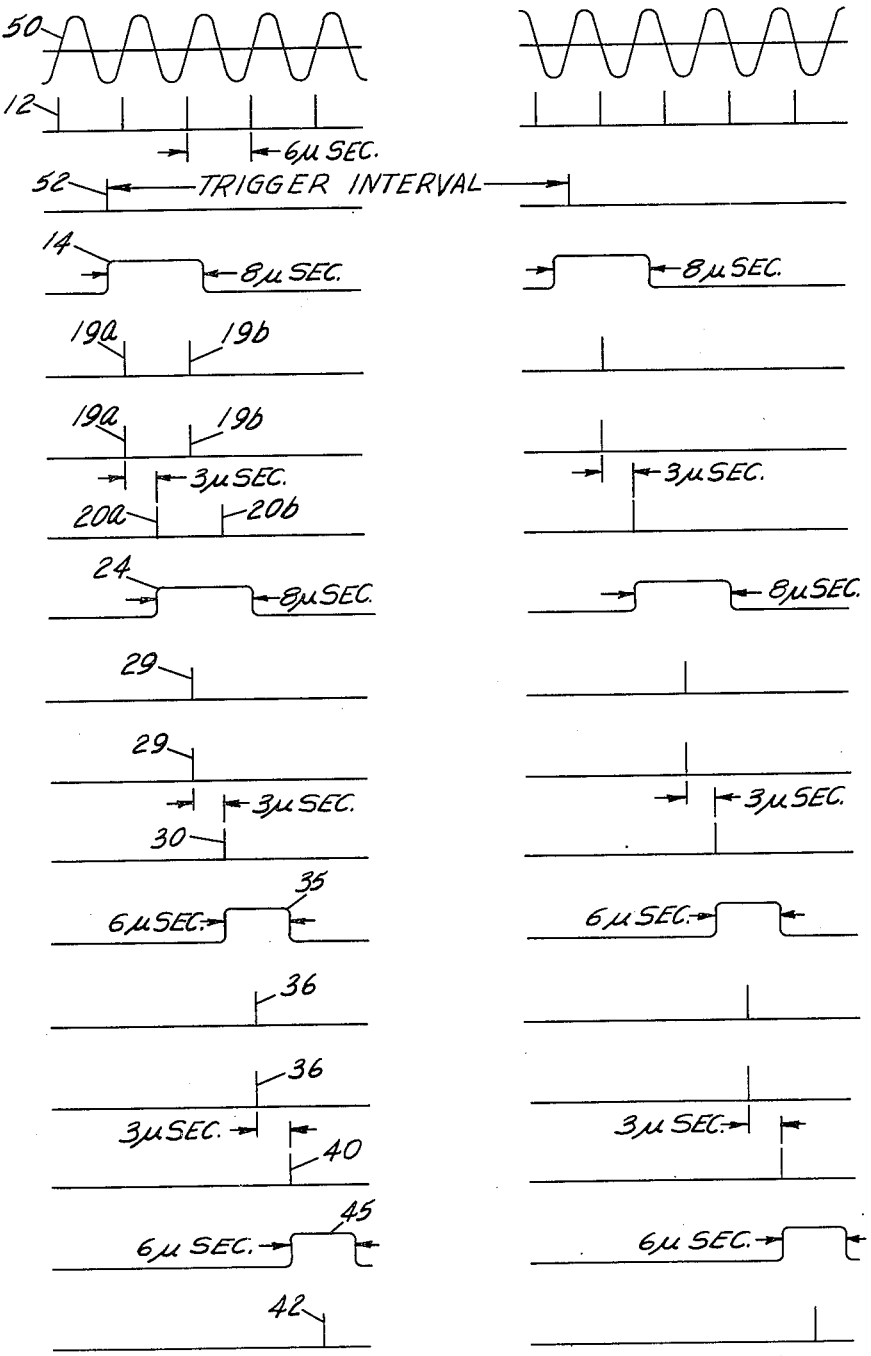

Other objects and advantages will become apparent from the following description and drawings, in which Fig. 1 is a schematic illustration of the circuitry required to get the first control pulse from the master timer of this invention;

Fig. 2 is a schematic illustration of the master timer of this invention which derives a plurality of pulses accurately spaced in time relative to the first control pulse; and Fig. 3 illustrates the form and time relation of the different waves obtained from various components of the master timer.

Referring to Fig. 1 a crystal oscillator 10 produces a sine wave output of very stable frequency. A frequency of 164 kilocycles per second has been chosen as an example because this frequency gives a period of six microseconds which is the time that it takes a radio wave to travel 1,000 yards.

A blocking oscillator 11 receives the output sine wave from the oscillator 10 and changes the wave form to peaked pulses 12. A pulse is obtained for each cycle of the sine wave.

A multi-vibrator 13 produces a gate 14 of eight microseconds duration when triggered. The multi-vibrators described herein may be replaced with any other type of pedestal generator. It is to be understood that this timer is used for illustration only and other values may be used in the broad principle of this invention.

The multi-vibrator 13 may be triggered by a blocking oscillator 16 at a frequency of 1,000–4,000 cycles per second, or may be triggered by an external trigger 17. The external trigger 17 may give trigger pulses at a random rate. That is to say, that trigger pulses may be one second apart at one instance and 1/3000 second apart at another instance. Random pulse generators are known to those skilled in the art and will not be described in detail in this specification.

A mixer 18 receives an output from blocking oscillator 11 and an output from multivibrator 13. When the mixer receives a gate 14 it allows either one or two pulses from blocking oscillator 11 to pass. Since the gate 14 is eight microseconds long and the time between pulses 12 is six microseconds, it is seen that at least one pulse 19 will pass. If the pulse 12 occurs shortly after the opening of the gate 14, two pulses will be passed by the mixer.

A blocking oscillator 21 receives the output from mixer 18 and gives the pulses greater amplitude. A delay line 22 receives the output from blocking oscillator 21 and delays each pulse for three microseconds. A multivibrator 23 is triggered by the output of the delay line 22 and gives a gate of eight microseconds duration. The gate 24 is triggered by the first pulse from the delay line 22 if two pulses were passed by the mixer 18. The second pulse would occur before the end of the gate 24 which would be before the multivibrator 23 had recovered and thus a second gate would not appear.

A mixer 26 receives the output from multivibrator 23 and also an output from blocking oscillator 11. The mixer 26 passes only one of the pulses fed to it because the eight microsecond gate falls approximately symmetrical about one of the pulses 12. It is to be remembered that multivibrator 23 is triggered three microseconds behind one of the pulses 12 and thus one of the pulses 12 will fall within the gate 24. Only one pulse will be obtained from mixer 26.

This pulse 27 is fed to a blocking oscillator 28 to increase its amplitude and then to terminal 29 where it may be used as a pretransmit pulse to prepare circuits in a radar set for a subsequent transmission.

In order to simplify the description of this invention, the manner of obtaining the first pulse was shown and described separately. Figure 2 comprises the system of Figure 1 with added circuitry for obtaining a second and third pulse accurately spaced in time from the first output pulse.

An output from blocking oscillator 28 is received by a second three microsecond delay line 31 and then furnished to a multivibrator 32 which gives a gate six microseconds long. A mixer 33 receives the gate from multivibrator 32. It is also connected to blocking oscillator 11 and one pulse will pass therethrough when a gate is received by mixer 33. It is to be observed that the pulse passed by mixer 33 is always the pulse succeeding the one passed by mixer 26. This is true because the pulse from mixer 26 is delayed three microseconds in delay line 31 before triggering multivibrator 32. The output of mixer 33 is furnished to a blocking oscillator 34 to increase the amplitude thereof. A terminal 36 furnishes the second control pulse which may also prepare circuits in radar apparatus for transmission. Some circuits must be controlled by the first control pulse and others by the second control pulse.

Thus far a system has been described which when triggered at a random or constant rate will always give an output of two pulses spaced six microseconds apart in time. The accuracy of spacing is determined by the accuracy of the crystal oscillator 10 and no errors are incorporated into the system by the use of delay lines 22 and 31.

A third control pulse 42 may be obtained by supplying the output of blocking oscillator 34 to a third three-microsecond delay line 37, multivibrator 38, mixer 39 and blocking oscillator 41. This circuitry is identical with the one used to obtain the second control pulse. This third control pulse may be used for firing the radar transmitter. Instead of being actuated by the first control pulse, the second control pulse is used. Likewise a fourth pulse may be obtained by using the third control pulse in a similar manner. Any number of pulses may be obtained all spaced six microseconds apart by using one pulse as a trigger for the succeeding pulse. The rate of triggering the multivibrator 13 must be slow enough so that when triggering has occurred, the control pulses may all be obtained before a second triggering signal is received. Thus, if three control pulses are desired, at least 18 microseconds must be allowed between triggering signals. It is desirable to allow a longer time than this minimum so that the radar circuits may fully recover between cycles.

Referring to Figure 3, the output of oscillator 10 is plotted against time as a sine wave 50. The blocking oscillator 11 transforms the sine wave 50 into a series of positive pulses 12. A triggering pulse 52, either from oscillator 16 or an external triggering source 17 actuates multivibrator 13 to obtain the gate 14. Since the trigger pulse 52 occurred only slightly prior to a pulse 12, the mixer 18 will pass two pulses 19a and 19b during the persistence of the eight microsecond gate. If the gate 14 had occurred more than two microseconds prior to the pulse 19a, only one pulse would be passed by mixer 18. The three microsecond delay line 22 delays the pulses 19a and 19b to obtain pulses 20a and 20b. The multivibrator 23 gives a gate 24 of eight microseconds duration in response to pulse 20a which allows the first control pulse 29 to pass the mixer 26. The first control pulse 29 is delayed by line 31 for three microseconds and the resultant pulse 30 is used to actuate the multivibrator 32. The gate 35 allows a second control pulse 36 to pass through mixer 33. Again a delay of three microseconds is obtained in line 37 and the pulse 40 is used to actuate multivibrator 38 to obtain the gate 45. The mixer 39 allows a third control signal 42 to pass through. It is to be observed that the first, 29, second 36 and third 42 control signals are spaced six microseconds apart. The accuracy of the spacing of the control pulses is not affected by inaccuracy in the delay lines. That is to say, a delay variation of between one to six microseconds is allowable in the system without effecting the time-spacing of the control pulses. The pulse 27 passed by mixer 26 will always be the pulse succeeding the first pulse fed to the delay line.

The second series of pulses shown on Figure 3 represent the time relationship as triggering occurs at some time subsequent to the triggering pulse 52. It is to be understood that this triggering interval may be constant, for example 500 microseconds or it may appear in a random manner. For example, between two triggering pulses there may be 1100 microseconds and between the second and third pulses there may be 275 microseconds. As previously stated, this variation in the pulse repetition rate is desirable when an enemy is attempting to jam a particular constant pulse repetition rate. All the wave forms in the second series of Fig. 3 are identical with the first series except the gate 14 picked up only one of the pulses 12 from blocking oscillator 11.

The use of the three control pulses may be best understood by an example. The first control pulse 29 might turn off the ranging circuits from a prior transmitting cycle. This gives the ranging circuits an opportunity to recover before another transmission occurs. The second control pulse 36 may be used for turning the ranging circuits back on. The third control pulse 42 occurs six microseconds later and turns the transmitter on. The ranging circuits have ample time between the second and third control pulses to prepare for transmission.

It is seen that this invention provides a system for obtaining a plurality of accurately-spaced control pulses each time a triggering pulse actuates the system. The accuracy of timing is dependent on the frequency stability of a crystal controlled oscillator.

Although this invention has been described with respect to preferred embodiments thereof, it is not to be so limited as changes and modifications may be made which are within the intended scope as defined by the following claims.

I claim:

1. A master timer for obtaining a plurality of control pulses accurately spaced in time comprising, a master oscillator producing a pulsed output, a first multivibrator producing a gate slightly longer than the time between adjacent pulses of the oscillator output, keying means connected to said first multivibrator to trigger it, a first mixer receiving an output from said master oscillator and an output from said first multivibrator, a first delay line receiving the output of said mixer and delaying it for a time less than the time between adjacent pulses, a second multivibrator receiving the output of said delay line and forming a gate in response thereto, a second mixer receiving an output from said master oscillator and the output of said second multivibrator, said second mixer passing a first control pulse in response to the gate from said second multivibrator, a second delay line receiving an output from said second mixer to delay it for a time less than the time between adjacent pulses, a third multivibrator receiving the output from said second delay line and forming a gate in response thereto, a third mixer receiving an output from said master oscillator and an output from said third multivibrator, and said third mixer passing a second control pulse in response to the gate from said third multivibrator.

2. In a master timer system for obtaining a plurality of control pulses accurately spaced in time, a first control pulse producing means comprising, a master oscillator producing a constant frequency output, a first pedestal generator producing a gate in response to keying, a first mixer receiving an output from said master oscillator and a gate from said first pedestal generator, a delay line receiving the output of said first mixer, a second pedestal generator triggered by the output of said delay line to form a gate, a second mixer receiving an output from the master oscillator and a gate from said second pedestal generator to obtain a first control pulse.

3. A master timer system for obtaining a plurality of pulses accurately spaced in time each time a trigger signal is received comprising, a master oscillator producing a sine wave output, a blocking oscillator receiving an output from said master oscillator and giving an output of peaked pulses, a first mixer receiving the output of said blocking oscillator, a first multivibrator receiving a trigger signal and producing a gate at least as long as the time between adjacent pulses fed to said first mixer in response thereto, said first mixer receiving the gate produced by the first multivibrator, a first delay line receiving the output of said first mixer and delaying it not more than the time between adjacent pulses from said blocking oscillator, a second multivibrator receiving the output of said first delay line and producing a gate in response thereto, a second mixer receiving an output from the blocking oscillator and an output from the second multivibrator to produce an output of a first control pulse, a second delay line receiving a signal from said second mixer and delaying it not more than the time between adjacent pulses from said blocking oscillator, a third multivibrator receiving the output of said second delay line and producing a gate in response thereto, a third mixer receiving a signal from the blocking oscillator and the gate from the third multivibrator to produce an output of a second control pulse, a third delay line receiving a signal from said third mixer, a fourth multivibrator receiving the output of said third delay line and producing a gate in response thereto, a fourth mixer receiving a signal from the blocking oscillator and the gate from the fourth multivibrator to produce an output of a third control pulse.

4. In a system according to claim 1 wherein said keying means produces a keying signal at a repetitive rate slower than the repetitive rate of the pulses from the master oscillator.

5. A master timer for obtaining a series of accurately timed pulses in response to a triggering signal comprising, a master oscillator producing a sine wave output, a first blocking oscillator receiving an output from said master oscillator and changing the sine wave into a series of peaked pulses, a first mixer receiving the output of said first blocking oscillator, a first multivibrator receiving a trigger signal and producing a gate in response thereto, said first mixer receiving the gate produced by the first multivibrator, a second blocking oscillator receiving the output of the first mixer, a first delay line receiving the output of said second blocking oscillator, a second multivibrator receiving the output of said first delay line and producing a gate in response thereto, a second mixer receiving an output from the first blocking oscillator and an output from the second multivibrator, a third blocking oscillator receiving the output of the second mixer to produce a first control pulse, a second delay line receiving an output from said third blocking oscillator, a third multivibrator receiving the output of said second delay line and producing a gate in response thereto, a third mixer receiving an output from the first blocking oscillator and the output from said third multivibrator, and a fourth blocking oscillator receiving the output of the third mixer to produce a second control pulse.

6. In a system according to claim 5 a third delay line receiving an output from the fourth blocking oscillator, a fourth multivibrator receiving the output of the third delay line to produce a gate in response thereto, a fourth mixer receiving an output from the first blocking oscillator and the output of the fourth multivibrator, and a fifth blocking oscillator receiving the output of the fourth mixer to produce a third control pulse.

7. In a system according to claim 1 wherein said keying means produces keying signals at a random rate.

8. In a system according to claim 1 wherein the first pedestal generator is keyed by means comprising a random pulse generator.

NOEL W. HANCOCK.

REFERENCES CITED

The following references are of record in the file of this patent:

UNITED STATES PATENTS

| Number | Name | Date |
| --- | --- | --- |
| 2,145,332 | Bedford | Jan. 31, 1939 |
| 2,418,116 | Grieg | Apr. 1, 1947 |
| 2,462,111 | Levy | Feb. 22, 1949 |
| 2,558,358 | Hales | June 26, 1951 |